United States Patent
Cha

(10) Patent No.: US 10,668,412 B2
(45) Date of Patent: Jun. 2, 2020

(54) AUTOMATIC FILTER CLEANING APPARATUS, AUTOMATIC FILTER CLEANING METHOD USING THE SAME, AND SUPERCRITICAL FLUID POWER GENERATION SYSTEM INCLUDING THE SAME

(71) Applicant: DOOSAN HEAVY INDUSTRIES & CONSTRUCTION CO., LTD., Changwon-si, Gyeongsangnam-do (KR)

(72) Inventor: Songhun Cha, Osan-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 125 days.

(21) Appl. No.: 15/935,038

(22) Filed: Mar. 25, 2018

(65) Prior Publication Data
US 2018/0361278 A1    Dec. 20, 2018

(30) Foreign Application Priority Data

Jun. 15, 2017  (KR) .......................... 10-2017-0075807

(51) Int. Cl.
*B01D 29/52* (2006.01)
*B01D 29/60* (2006.01)
(Continued)

(52) U.S. Cl.
CPC .......... *B01D 29/668* (2013.01); *B01D 29/52* (2013.01); *B01D 29/606* (2013.01); *F01K 7/16* (2013.01);
(Continued)

(58) Field of Classification Search
CPC .... B01D 29/668; B01D 29/606; B01D 29/52; B01D 2201/167; B01D 37/046;
(Continued)

(56) References Cited

U.S. PATENT DOCUMENTS 4,754,607 A * 7/1988 MacKay .................. F02C 6/18
237/12.1
4,906,357 A    3/1990 Drori
(Continued)

FOREIGN PATENT DOCUMENTS

JP        2012145092 A    8/2012
KR   1020030062881 A    7/2003
(Continued)

*Primary Examiner* — Joseph W Drodge
(74) *Attorney, Agent, or Firm* — Invenstone Patent, LLC

(57) ABSTRACT

A supercritical fluid power generation system includes an automatic filter cleaning apparatus, which is used in an automatic filter cleaning method. The system includes a cooler configured to cause a phase change of a working fluid from a gaseous state to a liquid state or to cool the working fluid to a low temperature; a fluid pump configured to receive and compress the working fluid from the cooler; a heat exchanger configured to heat the working fluid via a heat exchange with the working fluid which has passed through the fluid pump; at least one turbine configured to expand the heated working fluid and connected to a generator to produce electric power; a plurality of transport pipes in which the working fluid flows; and plural filter lines configured to remove, via back-flushing, a foreign substance included in the working fluid present in at least one of the transport pipes.

17 Claims, 11 Drawing Sheets

(51) Int. Cl.
  *B01D 29/66* (2006.01)
  *B01D 37/04* (2006.01)
  *F01K 7/16* (2006.01)
  *F01K 7/32* (2006.01)

(52) U.S. Cl.
  CPC .............. *F01K 7/32* (2013.01); *B01D 37/046* (2013.01); *B01D 2201/167* (2013.01)

(58) Field of Classification Search
  CPC .. B01D 46/46; B01D 46/446; B01D 46/0071; B01D 46/0058; B01D 29/0075; B01D 29/0079; B01D 29/0081; B01D 29/66; B01D 2201/086; B01D 46/0067; B01D 65/02; B01D 2247/04; B01D 2313/08; B01D 2313/18; B01D 2313/38; B01D 2313/48; B01D 2315/20; B01D 2317/04; B01D 2321/04; B01D 2321/2083; B01D 2321/40; B01D 24/002; B01D 24/38; B01D 24/46; B01D 24/4636; B01D 24/4884; B01D 27/108; B01D 27/142; B01D 29/29; B01D 29/005; B01D 29/00966; B01D 29/88; B01D 29/885; B01D 29/90; B01D 33/37; B01D 33/50; B01D 33/503; B01D 33/808; B01D 35/12; B01D 46/002; F01K 7/32; F01K 7/16; F01K 23/04; F01K 19/04; F01K 25/10; F01K 25/103; F01D 15/10; F01D 25/002; B08B 9/032; F02C 7/141; F02C 7/143
  USPC ........ 55/283, 284, 286, 302, 484; 95/19, 20, 95/51, 278, 286; 96/7, 8, 425, 426, 428; 210/108, 321.69, 340, 341, 636, 741, 791, 210/798, 333.01, 333.1
  See application file for complete search history.

(56) References Cited

U.S. PATENT DOCUMENTS

| | | | | | |
|---|---|---|---|---|---|
| 4,923,068 | A | * | 5/1990 | Crowson | B01D 29/60 210/108 |
| 4,980,066 | A | * | 12/1990 | Slegers | B01D 61/022 210/636 |
| 5,083,423 | A | * | 1/1992 | Prochaska | F02C 7/04 60/772 |
| 5,762,783 | A | * | 6/1998 | Harvey | B01D 29/114 210/108 |
| 6,368,513 | B1 | * | 4/2002 | Christophe | B01D 29/23 210/781 |
| 6,387,271 | B1 | * | 5/2002 | Geibel | B01D 39/06 210/651 |
| 6,951,614 | B2 | * | 10/2005 | Brett | B01D 37/046 210/108 |
| 9,365,063 | B1 | * | 6/2016 | Thayer | B41J 2/17563 |
| 2005/0139531 | A1 | * | 6/2005 | Gordon | B01D 29/15 210/108 |
| 2006/0261007 | A1 | * | 11/2006 | Zha | B01D 63/02 210/636 |
| 2007/0262003 | A1 | * | 11/2007 | Kussel | B01D 29/52 210/106 |
| 2008/0156709 | A1 | * | 7/2008 | Johnson | B01D 17/0202 210/106 |
| 2010/0133183 | A1 | * | 6/2010 | Theron | B01D 61/022 210/636 |
| 2010/0300114 | A1 | * | 12/2010 | Mhadeshwar | B01D 53/22 60/783 |
| 2013/0058853 | A1 | * | 3/2013 | Baker | B01D 53/22 423/228 |
| 2015/0166370 | A1 | * | 6/2015 | Armour | H04N 7/0115 210/636 |
| 2017/0144892 | A1 | * | 5/2017 | McCluskey | C02F 1/008 |

FOREIGN PATENT DOCUMENTS

KR     100861778 B1    10/2008
KR     10-2016-0070035 A    6/2016

* cited by examiner

AUTOMATIC FILTER CLEANING APPARATUS, AUTOMATIC FILTER CLEANING METHOD USING THE SAME, AND SUPERCRITICAL FLUID POWER GENERATION SYSTEM INCLUDING THE SAME

CROSS-REFERENCE TO RELATED APPLICATION

This application claims priority to and the benefit of Korean Patent Application No. 10-2017-0075807 filed in the Korean Intellectual Property Office on Jun. 15, 2017, the entire contents of which are incorporated herein by reference.

BACKGROUND OF THE INVENTION

Field of the Invention

The present invention relates to an automatic filter cleaning apparatus, an automatic filter cleaning method using the automatic filter cleaning apparatus, and a supercritical fluid power generation system including the automatic filter cleaning apparatus.

Description of the Related Art

Internationally, there is a growing need for efficient electric power production, and the movement to reduce the generation of pollutants is becoming more and more active. Thus, various efforts are being made to increase the production of electric power while reducing the generation of pollutants. One such effort is the research and development toward a supercritical carbon dioxide (CO2) power generation system that uses supercritical carbon dioxide as a working fluid, as disclosed in Japanese Patent Laid-Open Publication No. 2012-145092.

Supercritical carbon dioxide has a density similar to that of a liquid and a viscosity similar to that of a gas, thus making it possible to reduce the size of an apparatus using the same and to minimize the power consumption required for the compression and circulation of a fluid. Moreover, supercritical carbon dioxide is easy to handle because it has critical points of 31.4° C. and 72.8 atm, which are much lower than the critical points of 373.95° C. and 217.7 atm of water. A power generation system using such supercritical carbon dioxide shows a net power generation efficiency of about 45% when operating at 550° C. Moreover, the power generation system may improve power generation efficiency by 20% or more, compared with the power generation efficiency of a conventional steam cycle, and may reduce the size of a turbo device to one tenth of the original.

SUMMARY OF THE INVENTION

Therefore, the present invention has been made in view of the related art, and it is an object of the present invention to provide an automatic filter cleaning apparatus capable of automatically cleaning a filter to remove foreign substances accumulated in the filter, an automatic filter cleaning method using the automatic filter cleaning apparatus, and a supercritical fluid power generation system including the automatic filter cleaning apparatus.

In accordance with one aspect of the present invention, the above and other objects can be accomplished by the provision of a supercritical fluid power generation system including a cooler configured to cause a phase change of a working fluid from a gaseous state to a liquid state or to cool the working fluid to a low temperature; a fluid pump configured to receive and compress the working fluid from the cooler; a heat exchanger configured to heat the working fluid via a heat exchange with the working fluid which has passed through the fluid pump; at least one turbine configured to expand the heated working fluid and connected to a generator to produce electric power; a plurality of transport pipes in which the working fluid flows; and plural filter lines configured to remove, via back-flushing, a foreign substance included in the working fluid present in at least one of the transport pipes.

The plural filter lines may include a first filter line and a second filter line and may be connected to each other in parallel. The first filter line may include a first filter configured to filter the working fluid of the system, a control valve provided on each of opposite sides of the first filter, and a first pressure differential indicating transmitter configured to measure a pressure differential between the opposite sides of the first filter. The second filter line may include a second filter configured to filter the working fluid of the system, a control valve provided on each of opposite sides of the second filter, and a second pressure differential indicating transmitter configured to measure a pressure differential between the opposite sides of the second filter.

Alternatively, the first filter line may include a first filter configured to filter the working fluid, a first control valve provided on an input side of the first filter, a second control valve provided on an output side of the first filter, a first pressure differential indicating transmitter configured to measure a pressure across the first filter, and a first discharge pipe having a first end connected between the first control valve and the first filter and comprising a third control valve; and the second filter line may include a second filter configured to filter the foreign substance included in the working fluid, a fourth control valve provided on an input side of the second filter, a fifth control valve provided on an output side of the second filter, a second pressure differential indicating transmitter configured to measure a pressure across the second filter, and a second discharge pipe having a second end connected between the fourth control valve and the second filter and comprising a sixth control valve. The first filter line and the second filter line may be connected to each other in parallel.

The second discharge pipe may be connected at a second end to a second end of the first discharge pipe, the second end of the first discharge pipe may be connected to one of an outside atmosphere or a processing tank, and the system may further include a third filter provided downstream of the third control valve.

The system may further include a silencer provided downstream of the third filter, and/or an auxiliary cooler provided upstream of the third filter. The system may further include a connection pipe configured to connect the processing tank to the transport pipe, and the connection pipe may be provided with a transfer pump for supplying the working fluid stored in the processing tank to the transport pipe.

In accordance with another aspect of the present invention, there is provided an automatic filter cleaning apparatus including the above first and second filter lines. The first filter line and the second filter line may be connected to each other in parallel.

In accordance with another aspect of the present invention, there is provided an automatic filter cleaning method including the forming of the above first and second filter lines through control of the various control valves. The method may further include measuring the pressure differential between the opposite sides of the first filter using the first pressure differential indicating transmitter; and removing a foreign substance accumulated in the first filter via back-flushing, by opening the control valves provided on the opposite sides of the second filter, when the measured pressure differential reaches a preset reference value.

The method may further include filtering out the removed foreign substance using a third filter; storing the working fluid, which has passed through the third filter, in a processing tank; and supplying the working fluid stored in the processing tank back to the transport pipe. After the filtering, the method may further include removing noise generated by a discharge of the working fluid, by introducing the working fluid filtered through the third filter to a silencer. Before the filtering, the method may further include cooling the working fluid including the removed foreign substance, by introducing the working fluid to an auxiliary cooler.

In accordance with a further aspect of the present invention, there is provided an automatic filter cleaning method including the forming of the above first and second filter lines through control of the various control valves. The method may further include measuring the pressure differential between the opposite sides of the first filter using the first pressure differential indicating transmitter; and removing a foreign substance accumulated in the first filter via back-flushing, by repeatedly opening and closing the control valve provided on an output side of the first filter to generate a pulsed flow of the working fluid through the first filter, when the measured pressure differential reaches a preset reference value.

Details related to various other aspects of the present invention are included in the following detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
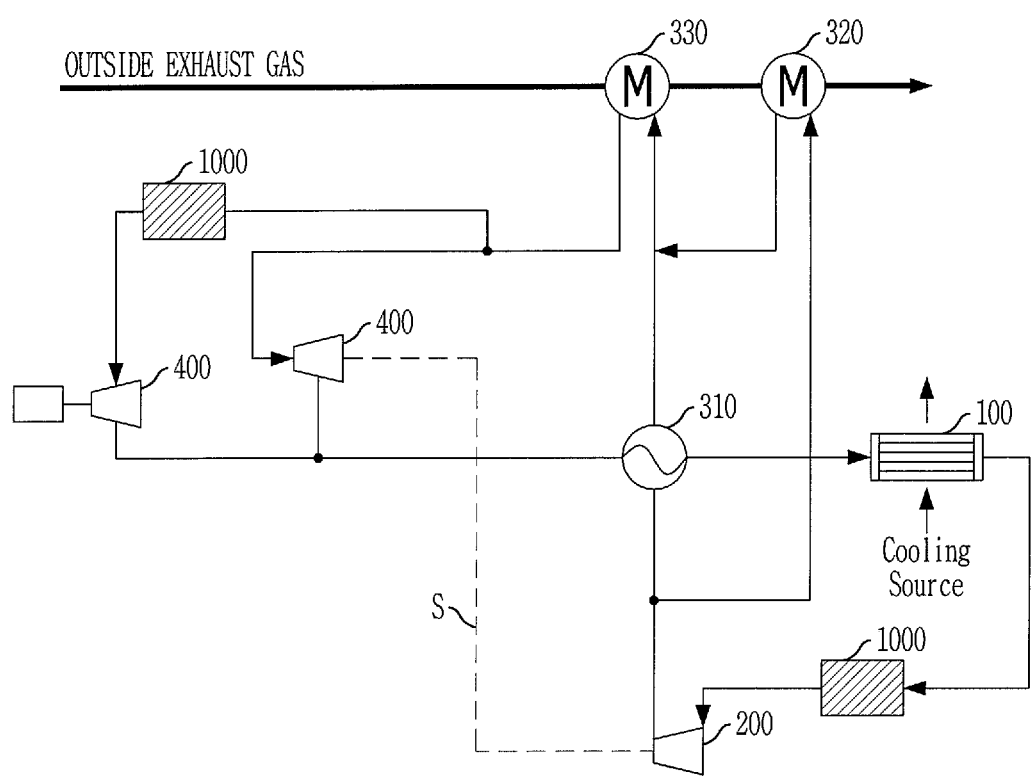
FIG. 1 is a view illustrating a supercritical fluid power generation system including an automatic filter cleaning apparatus according to a first embodiment of the present invention.

Since embodiments of the present invention can be variously modified in many different forms, reference will now be made in detail to specific embodiments of the present invention. It is to be understood that the present description is not intended to limit the present invention to those specific embodiments and that the present invention is intended to cover not only the specific embodiments but also various alternatives, modifications, equivalents and other embodiments that may be included within the spirit and scope of the present invention as defined by the appended claims.

The terminology used herein is for the purpose of describing particular embodiments only and is not intended to be limiting. As used herein, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof, but do not preclude the presence or addition of one or more other features, integers, steps, operations, elements, components, and/or combinations thereof.

Hereinafter, exemplary embodiments of the present invention will be described in detail with reference to the accompanying drawings. Here, wherever possible, the same reference numbers will be used throughout the drawings to refer to the same or like parts. In addition, in the following description of the embodiments, a detailed description of known functions and configurations incorporated herein will be omitted when it may impede the understanding of the embodiments. For the same reason, in the drawings, some components are exaggerated, omitted or schematically illustrated.

In general, a supercritical fluid power generation system forms a closed cycle that does not discharge a working fluid used for power generation to the atmosphere, and uses, as the working fluid, supercritical carbon dioxide, supercritical nitrogen, supercritical argon, supercritical helium, or the like.

The supercritical fluid power generation system may use exhaust gas, which is discharged from various types of power plants such as a thermoelectric power plant, a solar thermal power plant, and a nuclear power plant, and may be used not only in a single power generation system, but also in a hybrid power generation system of various types of power plants including a gas turbine power generation system, a thermoelectric power generation system, a solar thermal power plant, a nuclear power plant, and the like.

The working fluid in the cycle passes through a compressor, and is then heated while passing through a heat source such as a heater to thereby enter a high-temperature and high-pressure supercritical state, and the resulting supercritical working fluid drives a turbine. A generator is connected to the turbine and is driven by the turbine to produce electric power. The working fluid used for the production of electric power is cooled while passing through a heat exchanger, and the cooled working fluid is again supplied to the compressor to circulate in the cycle. A plurality of turbines or a plurality of heat exchangers may be provided.

The supercritical fluid power generation system according to various embodiments of the present invention conceptually includes not only a system in which the entirety of a working fluid flowing in the cycle is in a supercritical state, but also a system in which only the majority of the working fluid flows while in a supercritical state with the remainder being in a subcritical state.

FIG. 1 illustrates a supercritical fluid power generation system including an automatic filter cleaning apparatus according to a first embodiment of the present invention.

As shown in FIG. 1, the supercritical fluid power generation system according to the embodiment of the present invention includes a cooler 100, a fluid pump 200, first to third heat exchangers 310, 320 and 330, at least one turbine 400, and a generator 500. The automatic filter cleaning apparatus, designated by reference numeral 1000, is provided in a transport pipe in which a working fluid flows. The automatic filter cleaning apparatus 1000 may be provided between the cooler 100 and the fluid pump 200 and/or between the third heat exchanger 330 and the turbine 400.

The supercritical fluid power generation system according to the embodiment of the present invention uses, as the working fluid, for example, at least one of supercritical carbon dioxide, supercritical nitrogen, supercritical argon, supercritical helium, and the like.

It should be understood that the respective components of the present invention are connected to one another by a transport pipe in which the working fluid flows, and the working fluid flows along the transport pipe, although this is not specifically mentioned. However, in the case in which a plurality of components is integrated, a component or a region, which effectively serves as the transport pipe, may be present in the integrated configuration. Even in this case, it should be naturally understood that the working fluid of the system flows along the transport pipe. A flow path having a separate function will be additionally described.

The turbine 400 is driven by the working fluid, and serves to produce electric power by driving the generator 500, which is connected to at least one turbine. Since the working fluid expands while passing through the turbine 400, the turbine 400 also serves as an expander.

The working fluid, which is introduced in a gaseous state into the cooler 100, undergoes a phase change into a liquid state while being cooled by a cooling source. Alternatively, when the temperature of the cooling source is high, the gaseous working fluid introduced into the cooler 100 is cooled to a low-temperature supercritical working fluid by the cooling source.

The fluid pump 200 receives the working fluid, which has undergone the phase change into the liquid state by cooling, or the low-temperature supercritical working fluid, and compresses the working fluid to make the working fluid enter a low-temperature and high-pressure state. That is, the fluid pump 200 receives the working fluid from the cooler 100. The fluid pump 200 may be a rotary-type pump which is connected to the turbine 400 via a single drive shaft S, and upon rotation of the turbine 400, the fluid pump 200 is thus rotated together with the turbine 400.

Some of the working fluid, which has passed through the fluid pump 200, undergoes heat exchange with a medium-temperature and low-pressure working fluid in the first heat exchanger 310 to enter a medium-temperature and high-pressure state, and is heated by high-temperature outside exhaust gas in the third heat exchanger 330 to enter a high-temperature and high-pressure state.

The remaining working fluid, which has passed through the fluid pump 200, is heated by the high-temperature outside exhaust gas in the second heat exchanger 320 to enter a medium-temperature and high-pressure state, and is heated by the high-temperature outside exhaust gas in the third heat exchanger 330 to enter a high-temperature and high-pressure state.

The high-temperature and high-pressure working fluid enters a medium-temperature and low-pressure state while passing through the turbine 400. Then, while passing through the first heat exchanger 310, the working fluid undergoes, heat exchange with some of the low-temperature and high-pressure working fluid, which has passed through the fluid pump 200, to enter a low-temperature and low-pressure state, and is then introduced into the cooler 100.

In the supercritical fluid power generation system having the cycle described above, foreign substances such as particles and dust are generated on surfaces of the inner wall of the transport pipe in which the working fluid flows, due to the wall's friction with respect to the working fluid. In a power generation system, this flow of foreign substances within the working fluid causes damage to a rotary-type pump blade or a turbine blade of the system.

In the present invention, in order to prevent this, a filter is provided in the supercritical fluid power generation system to remove the flowing foreign substances, and the automatic filter cleaning apparatus 1000 is provided to automatically clean the filter.

The automatic filter cleaning apparatus 1000 of the present invention is provided in the transport pipe in which the working fluid flows. The automatic filter cleaning apparatus 1000 may be provided between the cooler 100 and the fluid pump 200 and/or between the third heat exchanger 330 and the turbine 400.

Hereinafter, the automatic filter cleaning apparatus 1000 according to the first embodiment of the present invention will be described with reference to FIG. 2.

Figure 2:
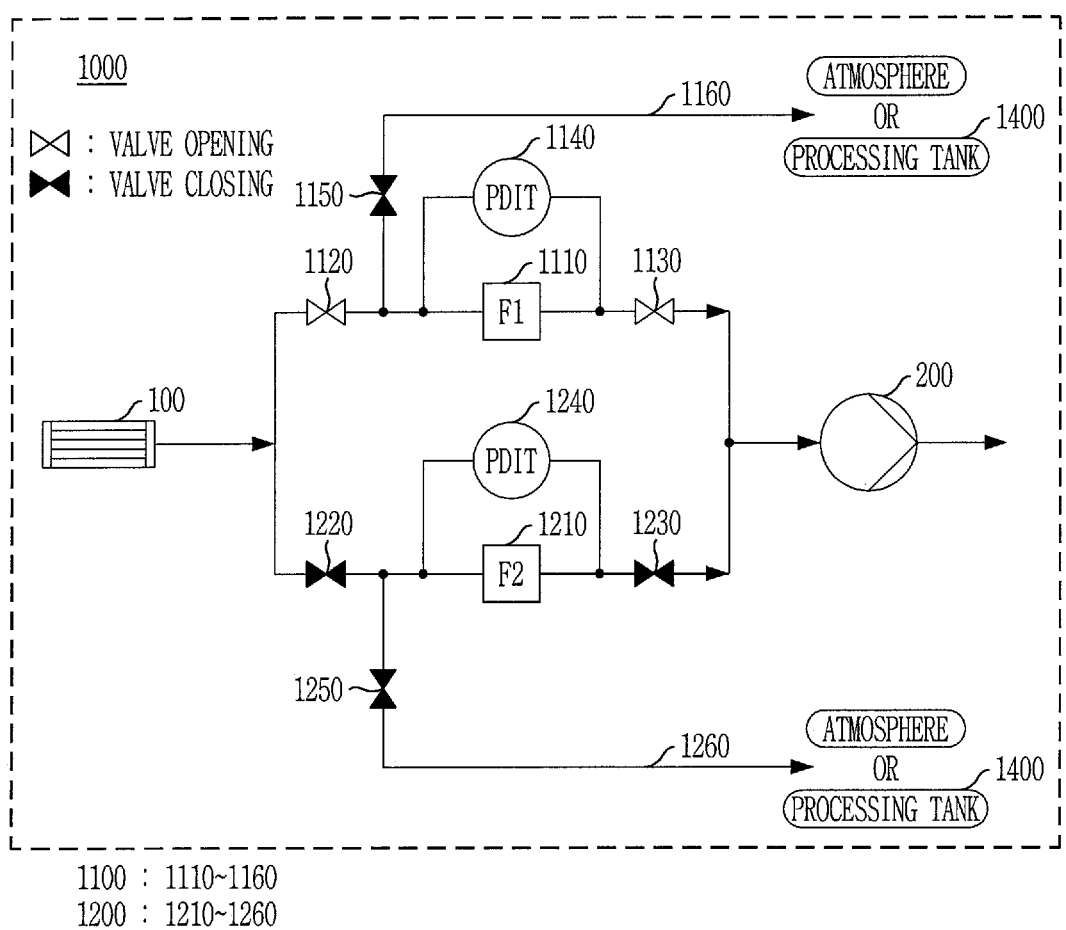
FIG. 2 is a view illustrating the automatic filter cleaning apparatus according to the first embodiment of the present invention.

As shown in FIG. 2, the automatic filter cleaning apparatus 1000 according to the embodiment includes a first filter line 1100 and a second filter line 1200, which are connected to each other in parallel. The first filter line 1100 includes components having reference designations of 1110 to 1160, and the second filter line 1200 includes components having reference designations of 1210 to 1260.

The first filter line 1100 includes a first filter 1110, a first control valve 1120, a second control valve 1130, a first pressure differential indicating transmitter (PDIT) 1140, a third control valve 1150, and a first discharge pipe 1160.

The first filter 1110 removes the foreign substances included in the working fluid introduced to the transport pipes of the system from the cooler 100. The first filter 1110 removes the foreign substances present in the working fluid downstream from the cooler 100. The first control valve 1120 is provided on the input side of the first filter 1110, and the second control valve 1130 is provided on the output side of the first filter 1110. Here, the input and output sides refer to working fluid flow directionality with respect to the first filter 1110, wherein the input side is toward the cooler 100, and the output side is the opposite side and toward the fluid pump 200 or the turbine 400.

The first pressure differential indicating transmitter 1140 has one end connected to a flow path existing between the first filter 1110 and the first control valve 1120 and the other end connected to a flow path existing between the first filter 1110 and the second control valve 1130. Thus, the first pressure differential indicating transmitter 1140 measures the pressure across the first filter 1110. In other words, the first pressure differential indicating transmitter 1140 measures the pressure differential between a point upstream of the first filter 1110 and a point downstream of the first filter 1110, and transmits the measured value to a controller (not illustrated). The controller controls the operation of all the control valves of the first and second filter lines 1100 and 1200 based on the measured value.

The first discharge pipe 1160 is connected at one end to a flow path existing between the first control valve 1120 and the first filter 1110, and includes the third control valve 1150. The first discharge pipe 1160 is connected at the other end to the outside atmosphere or to a processing tank 1400, which may be separately or externally provided.

The construction and operation of the second filter line 1200 is essentially the same as the first filter line 1100. That is, the second filter line 1200 includes a second filter 1210, a fourth control valve 1220, a fifth control valve 1230, a second pressure differential indicating transmitter 1240, a sixth control valve 1250, and a second discharge pipe 1260.

The second filter 1210 removes the foreign substances included in the working fluid included in the working fluid introduced to the transport pipes of the system from the cooler 100. The fourth control valve 1220 is provided on the input side of the second filter 1210, and the fifth control valve 1230 is provided on the output side of the second filter 1210. Here, analogous to the first filter line 1100, the input and output sides refer to working fluid flow directionality with respect to the second filter 1210, wherein the input side is toward the cooler 100, and the output side is the opposite side and toward the fluid pump 200 or the turbine 400.

The second pressure differential indicating transmitter 1240 has one end connected to a flow path existing between the second filter 1210 and the fourth control valve 1220 and the other end connected to a flow path existing between the second filter 1210 and the fifth control valve 1230. Thus, the second pressure differential indicating transmitter 1240 measures the pressure across the second filter 1210. In other words, the second pressure differential indicating transmitter 1240 measures the pressure differential between a point upstream of the second filter 1210 and a point downstream of the second filter 1210, and transmits the measured value to the controller, which controls the operation of all the control valves of the first and second filter lines 1100 and 1200 based on the measured value. Thus, the controller uses the measured values received from the first and second pressure differential indicating transmitters 1140 and 1240 to control the operation of the first to sixth control valves 1120, 1130, 1150, 1120, 1230, and 1250.

The second discharge pipe 1260 is connected to a position between the fourth control valve 1220 and the second filter 1210, and includes the sixth control valve 1250. The second discharge pipe 1260 is connected to the outside atmosphere or to the processing tank 1400, which may be separately or externally provided.

The first discharge pipe 1160 and the second discharge pipe 1260 may be connected to each other so as to be connected to a single processing tank. Alternatively, the first discharge pipe 1160 and the second discharge pipe 1260 may remain separate from each other so as to be connected respectively to plural processing tanks.

Figure 3:
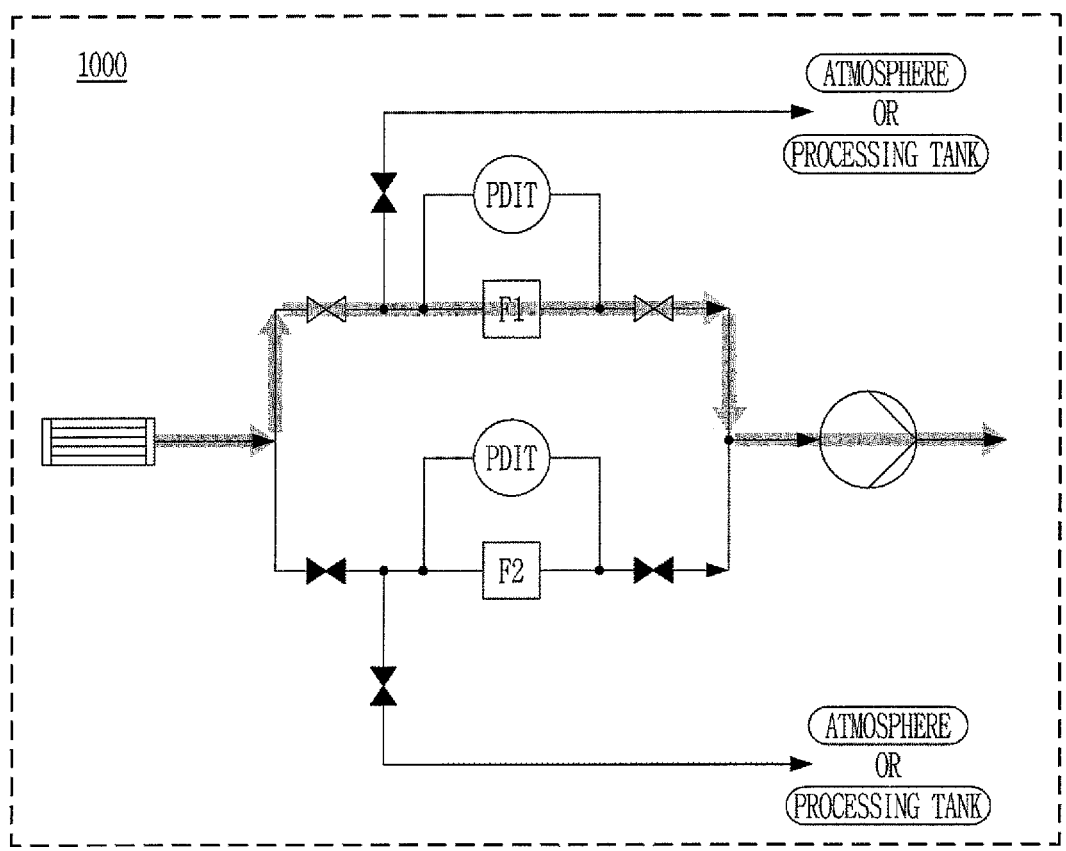
FIGS. 3 to 5 are views illustrating an automatic filter cleaning method using the automatic filter cleaning apparatus according to the first embodiment of the present invention upon the normal operation of the supercritical fluid power generation system.

Next, an automatic filter cleaning method using the automatic filter cleaning apparatus 1000 according to the first embodiment of the present invention will be described with reference to FIGS. 3 to 5, wherein the supercritical fluid power generation system is shown in a state of normal operation.

At the initial stage of operation (a system online situation) of the supercritical fluid power generation system, the first control valve 1120 and the second control valve 1130 are opened, and the third to sixth control valves 1150, 1220, 1230 and 1250 are closed. As shown in FIG. 3, the working fluid from the cooler 100 passes through the first filter 1110 of the first filter line 1100 and is introduced into the fluid pump 200, and the foreign substances included in the working fluid are filtered out by the first filter 1110. The filtered foreign substances accumulate on the input side (the left side in the drawing) of the first filter 1110, and the accumulation produces a pressure differential across the first filter 1110. The first pressure differential indicating transmitter 1140 measures the pressure differential between the upstream side and the downstream side of the first filter 1110 caused by the accumulation of the foreign substances, and transmits the measured pressure differential (value) to the controller. The pressure differential increases as an accumulation of the foreign substances on the input side of the first filter 1110 continues over time, which is reflected in a rising value of the measured pressure differential.

Figure 4:
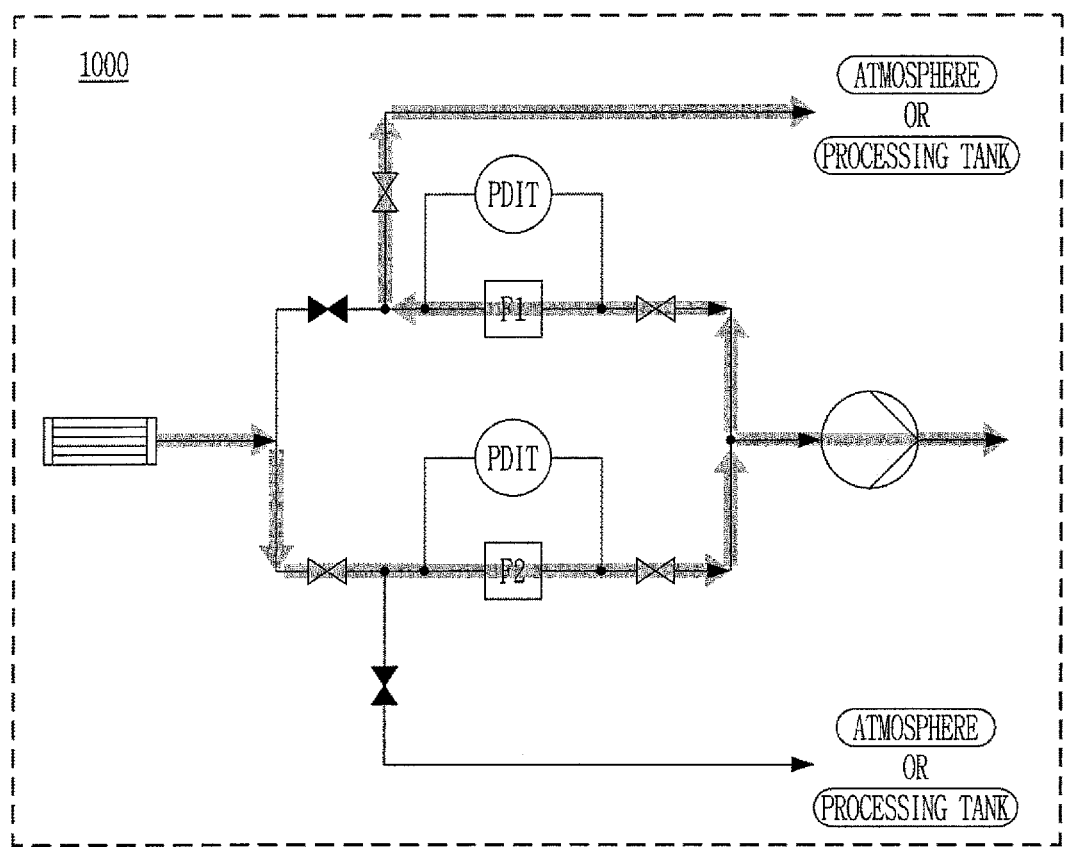

When the pressure differential of the first filter 1110 measured by the first pressure differential indicating transmitter 1140 reaches a preset reference value after a passage of time, the controller closes the first control valve 1120 and the sixth control valve 1250 and opens the second to fifth control valves 1130, 1150, 1220 and 1230, as shown in FIG. 4. At this time, the working fluid from the cooler 100 passes through the second filter 1210 of the second filter line 1200 so that some of the working fluid is introduced into the fluid pump 200 and the remaining working fluid flows backwards through the first filter line 1100. The backflowing working fluid flows through the first filter line 1100 from right to left in the drawing, that is, from the output side of the first filter 1110 back to the input side thereof, and thus removes the foreign substances accumulated on the input side of the first filter 1110. The removed foreign substances are discharged to the outside atmosphere or to the processing tank 1400 through the first discharge pipe 1160.

Meanwhile, the foreign substances included in the working fluid passing through the second filter line 1200 are filtered out by the second filter 1210. The filtered foreign substances accumulate on the input side (the left side in the drawing) of the second filter 1210, and the accumulation produces a pressure differential across the second filter 1210. The second pressure differential indicating transmitter 1240 measures the pressure differential between the upstream side and the downstream side of the second filter 1210 caused by the accumulation of the foreign substances, and transmits the measured pressure differential (value) to the controller. The pressure differential increases as an accumulation of the foreign substances on the input side of the second filter 1210 continues over time, which is reflected in a rising value of the measured pressure differential.

Figure 5:
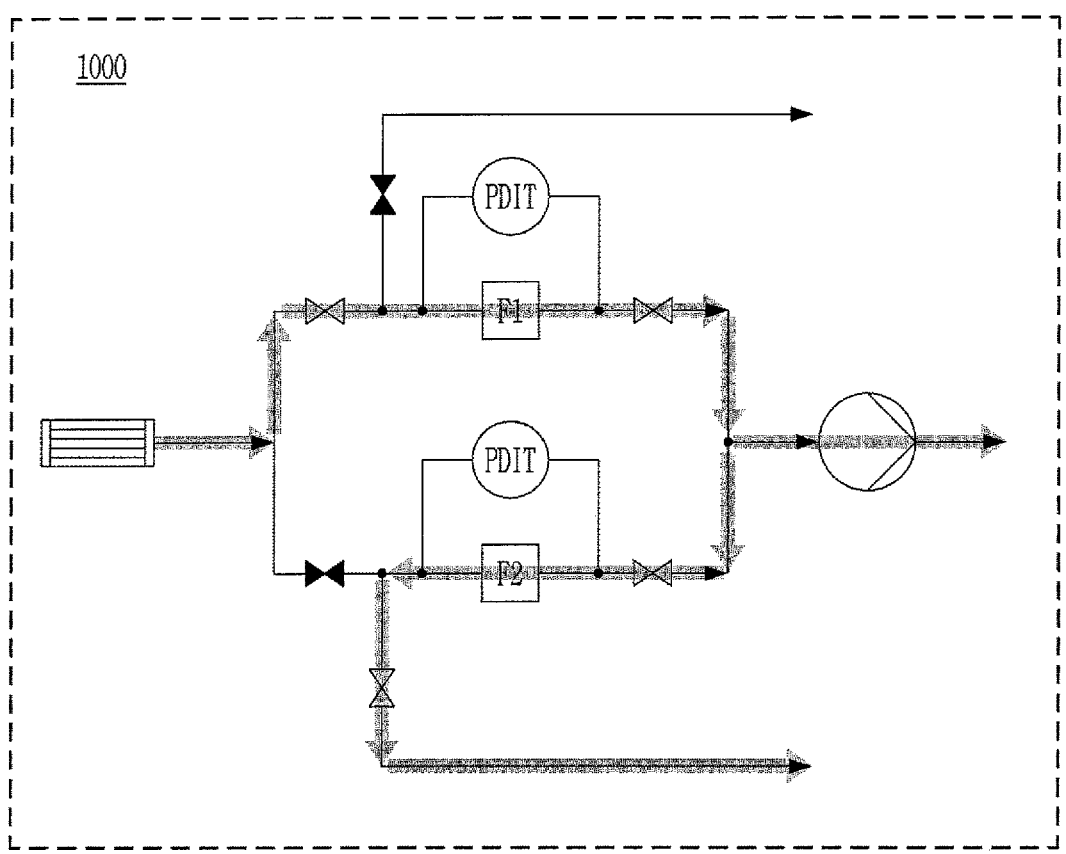

When the pressure differential of the second filter 1210 measured by the second pressure differential indicating transmitter 1240 reaches a preset reference value after a passage of time, the controller closes the third control valve 1150 and the fourth control valve 1220 and opens the first control valve 1120, the second control valve 1130, the fifth control valve 1230, and the sixth control valve 1250, as shown in FIG. 5. At this time, the working fluid from the cooler 100 passes through the first filter 1110 of the first filter line 1100 so that some of the working fluid is introduced into the fluid pump 200 and the remaining working fluid flows backwards through the second filter line 1200. The backflowing working fluid flows through the second filter line 1200 from right to left in the drawing, that is, from the output side of the second filter 1210 back to the input side thereof, and thus removes the foreign substances accumulated on the input side of the second filter 1210. The removed foreign substances are discharged to the outside atmosphere or to the processing tank 1400 through the second discharge pipe 1260.

As described above, when dual filter lines are provided by connecting the first filter line 1100 and the second filter line 1200 to each other in parallel, it is possible to remove the foreign substances generated due to friction between the inner wall surface of the transport pipe and the working fluid, thereby preventing damage to a rotary-type pump blade or a turbine blade.

In addition, through the provision of the dual filter lines, it is possible to automatically clean the filter via back-flushing by using the pressure differential caused by the foreign substance accumulation in the filter. Thereby, it is possible to semi-permanently use the filter without periodically replacing the filter, or with less frequent filter replacement, which enables a reduction in labor and costs associated with the maintenance and repair required for the replacement of the filter.

Figure 6:
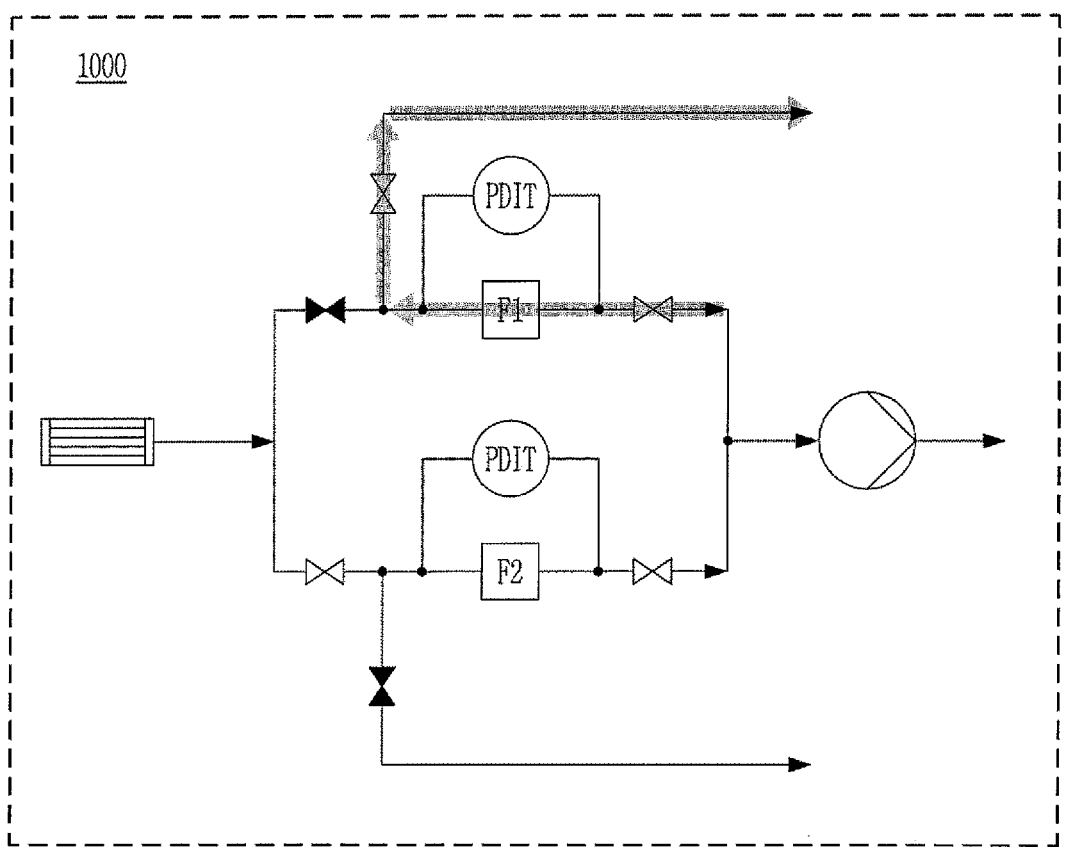
FIG. 6 is a view illustrating the automatic filter cleaning method using the automatic filter cleaning apparatus according to the first embodiment of the present invention when the operation of the supercritical fluid power generation system is stopped.

Next, the automatic filter cleaning method using the automatic filter cleaning apparatus according to the first embodiment of the present invention will be described with reference to FIG. 6, wherein the supercritical fluid power generation system is shown in a state of being stopped.

The automatic filter cleaning method of the present invention may also be implemented in the situation in which the operation of the supercritical fluid power generation system is stopped (system offline situation). System operation may be considered to be offline when the operation of the fluid pump 200 or the turbine 400 has stopped.

Even when system operation is stopped, the insides of various transport pipes of the system are filled with the working fluid. When the value (pressure differential) measured by the first pressure differential indicating transmitter 1140 reaches a preset reference value in the state in which the transport pipe is filled with the working fluid, the controller closes the first control valve 1120 and the sixth control valve 1250, and opens the third to fifth control valves 1150, 1220, and 1230. Then, in this state, the controller repeatedly opens and closes the second control valve 1130 to generate a pulsed flow of the working fluid through the first filter 1110, thereby enabling the automatic cleaning of the first filter 1110 via back-flushing.

Likewise, when the value (pressure differential) measured by the second pressure differential indicating transmitter 1240 reaches a preset reference value in the state in which the transport pipe is filled with the working fluid, the controller closes the third control valve 1150 and the fourth control valve 1220, and opens the first control valve 1120, the second control valve 1130, and the sixth control valve 1250. Then, in this state, the controller repeatedly opens and closes the fifth control valve 1230 to generate a pulsed flow of the working fluid through the second filter 1210, thereby enabling the automatic cleaning of the second filter 1210 via back-flushing.

Even in the situation in which the operation of the system is stopped, the working fluid present therein has a pressure within the range of, for example, 60 bar to 120 bar. When the inside of the system communicates with the outside having a lower pressure due to the opening of various control valves, the working fluid may flow to the region of lower pressure. Since the first discharge pipe 1160 and the second discharge pipe 1260 are connected to the outside atmosphere having a pressure of 1 bar or to the processing tank 1400 having a pressure within the range of 10 bar to 20 bar, in the case in which the flow path connected to the outside atmosphere or the processing tank 1400 is formed, the working fluid present in the stopped system may flow to the outside atmosphere or to the processing tank 1400, and in this process, may automatically clean the first filter or the second filter via back-flushing.

As described above, the automatic filter cleaning method of the present embodiment may enable the automatic cleaning of a filter via back-flushing using the pressure differential caused by the foreign substance accumulation in the filter even in the state in which the operation of the system is stopped.

Next, a filter maintenance and repair method of the automatic filter cleaning apparatus 1000 according to the first embodiment of the present invention will be described with reference to FIG. 7.

Figure 7:
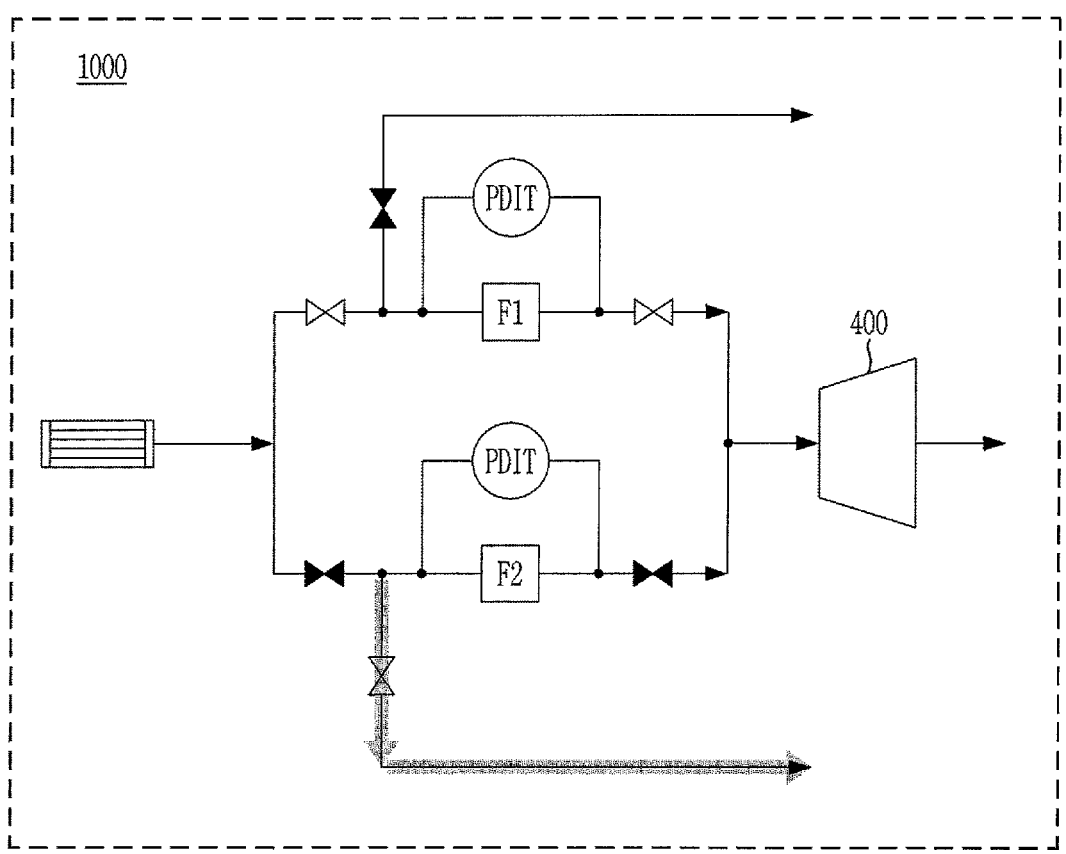
FIG. 7 is a view illustrating a filter maintenance and repair method of the automatic filter cleaning apparatus according to the first embodiment of the present invention.

FIG. 7 illustrates the normal operation of the supercritical fluid power generation system, and specifically, illustrates the state in which the foreign substances are filtered via the first filter line 1100 of the automatic filter cleaning apparatus. In this state, a process of separating the second filter 1210 from the second filter line 1200 for the replacement or repair of the second filter 1210 is as follows.

First, the working fluid remaining in the transport pipe between the fourth control valve 1220 and the fifth control valve 1230 is removed for worker safety. To this end, in the state in which the fourth control valve 1220, the fifth control valve 1230, and the sixth control valve 1250 are initially closed, the sixth control valve 1250 is opened while the fourth and fifth control valves 1220 and 1230 remain closed. Since the working fluid has a relatively high pressure and is connected to the outside (i.e., the atmosphere or a processing tank) having a lower pressure via the opening of the sixth control valve 1250, the working fluid remaining in the transport pipe between the fourth control valve 1220 and the fifth control valve 1230 is discharged through the second discharge pipe 1260.

Subsequently, when the working fluid is entirely removed through the second discharge pipe 1260, the sixth control valve 1250 is again closed to prevent the removed working fluid from flowing backwards through the second discharge pipe 1260 and being reintroduced to the system. In particular, in the case in which the second discharge pipe 1260 is connected to the processing tank 1400 having a pressure within the range of approximately 10 bar to 20 bar, the sixth control valve 1250 is immediately closed since the pressure differential may be reversed after the discharge of the working fluid, thus causing the working fluid to flow backwards via the second discharge pipe 1260, from the processing tank 1400 to the transport pipe in which the second filter 1210 is provided.

Subsequently, the second filter 1210 may be safely separated from the transport pipe.

In this way, the filter maintenance and repair method of the present embodiment has the advantage of enabling filter replacement or repair even during the operation of the supercritical fluid power generation system.

Next, an automatic filter cleaning apparatus 1000 according to a second embodiment of the present invention will be described with reference to FIG. 8.

Figure 8:
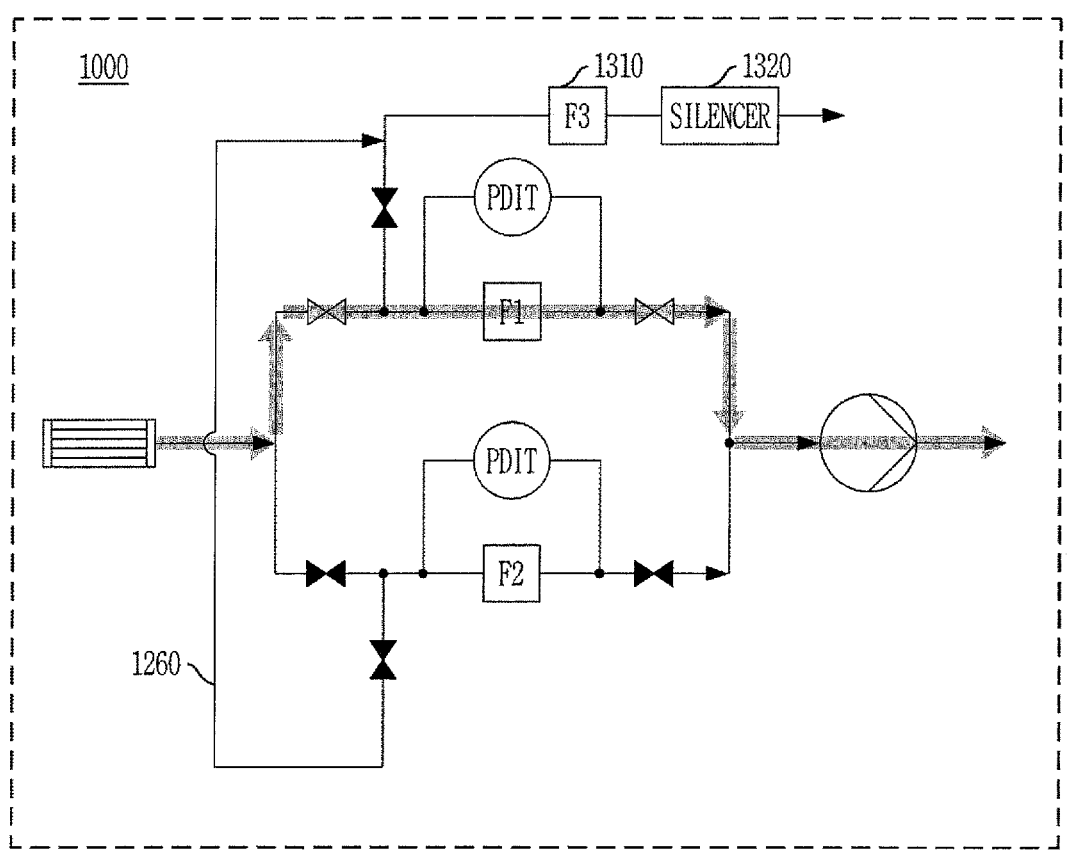
FIG. 8 is a view illustrating an automatic filter cleaning apparatus according to a second embodiment of the present invention.

Referring to FIG. 8, in the automatic filter cleaning apparatus 1000 of the present embodiment, the second discharge pipe 1260 is connected to the first discharge pipe 1160, and the first discharge pipe 1160 is connected to the outside atmosphere or to the processing tank 1400. A third filter 1310 may be provided downstream of the third control valve 1150, and a silencer 1320 may be selectively provided downstream of the third filter 1310.

The third filter 1310 filters the foreign substances discharged from the first filter line 1100 or the second filter line 1200 to prevent the foreign substances from being discharged to the outside atmosphere, thereby preventing environmental pollution.

In the case in which the first discharge pipe 1160 is connected to the processing tank 1400, it is possible to allow the working fluid, from which the foreign substances have been removed, to be stored in the processing tank 1400, and to enable the recycling of the working fluid by re-supplying the system with the stored working fluid.

In the case in which the first discharge pipe 1160 is connected to the outside atmosphere, excessive noise is generated when the working fluid is discharged to the outside atmosphere. Therefore, the silencer 1320 may be installed to prevent noise pollution.

Next, an automatic filter cleaning apparatus 1000 according to a third embodiment of the present invention will be described with reference to FIG. 9.

Figure 9:
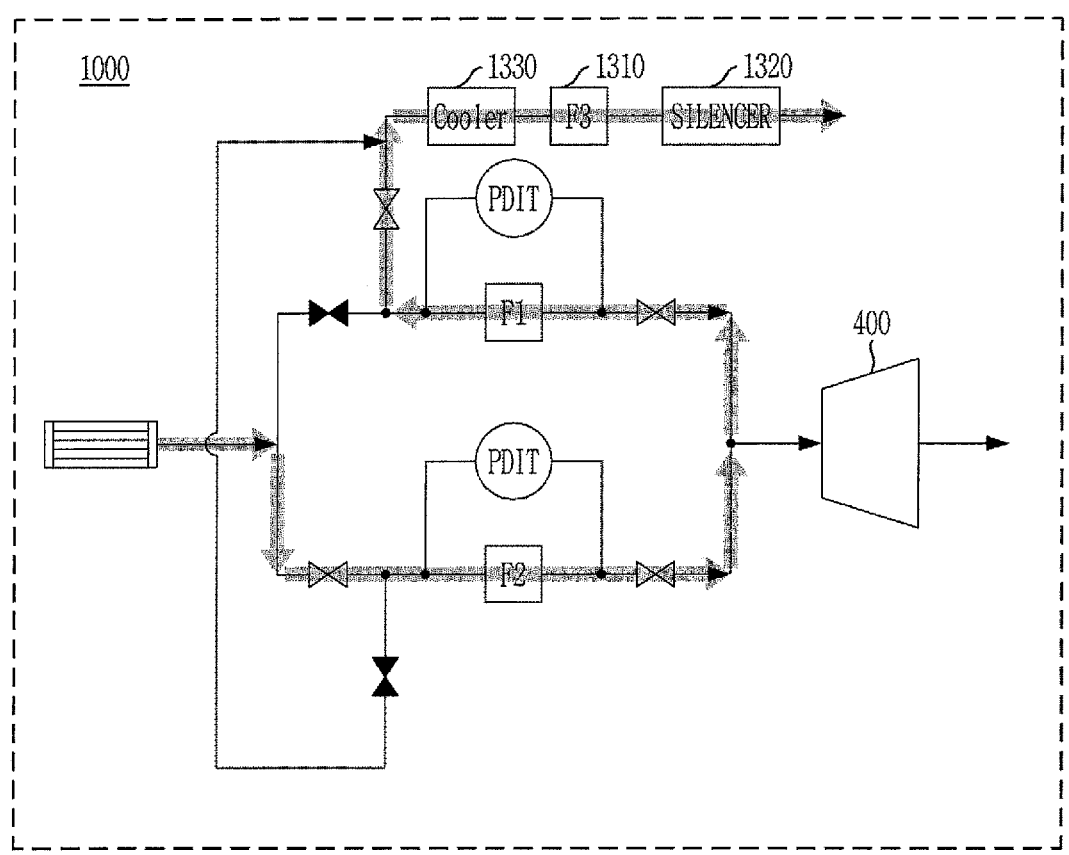
FIG. 9 is a view illustrating an automatic filter cleaning apparatus according to a third embodiment of the present invention.

Referring to FIG. 9, the automatic filter cleaning apparatus 1000 of the present embodiment is similar to that of the above-described second embodiment in that the second discharge pipe 1260 is connected to the first discharge pipe 1160, the first discharge pipe 1160 is connected to the outside atmosphere or to the processing tank 1400, the third filter 1310 is provided downstream of the third control valve 1150, and the silencer 1320 is selectively provided downstream of the third filter 1310.

The automatic filter cleaning apparatus 1000 is provided on the input side of the turbine 400, and the working fluid to be introduced into the turbine 400 is in a high-temperature and high-pressure state. Thus, since the working fluid, which is discharged through the first discharge pipe 1160 and includes the foreign substances, also has a high temperature, a process of cooling the working fluid prior to discharging the working fluid to the outside atmosphere or to the processing tank 1400 is required. To this end, the automatic filter cleaning apparatus 1000 of the present embodiment further includes an auxiliary cooler 1330 provided upstream of the third filter 1310.

The foreign substances included in the high-temperature and high-pressure working fluid to be introduced into the turbine 400 are filtered out by the first filter 1110 or the second filter 1210, and after filter cleaning via back-flushing, the working fluid and the foreign substances separated from the first filter 1110 or the second filter 1210 are cooled by the auxiliary cooler 1330. Thereafter, the foreign substances are filtered out by the third filter 1310, and the cooled working fluid selectively passes through the silencer 1320 so as to be discharged to the outside atmosphere or to the processing tank 1400 without the generation of excessive noise.

Next, an automatic filter cleaning apparatus 1000 according to a fourth embodiment of the present invention will be described with reference to FIG. 10.

Figure 10:
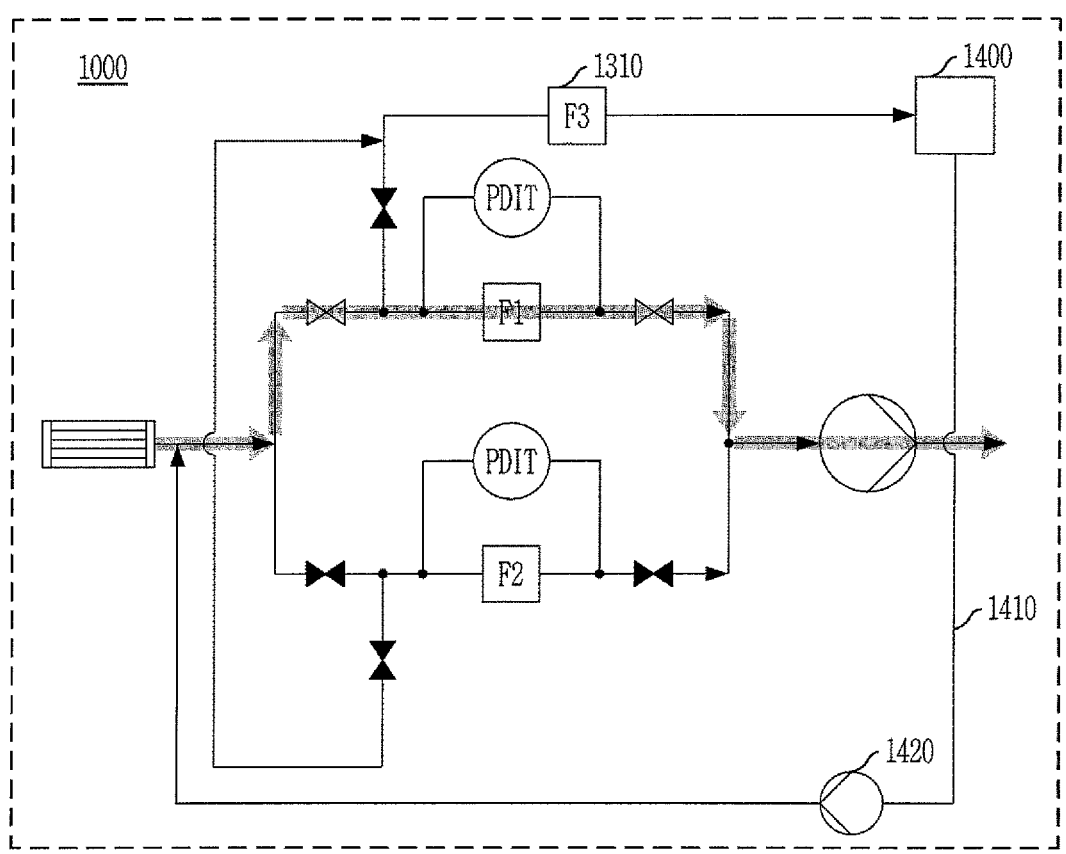
FIG. 10 is a view illustrating an automatic filter cleaning apparatus according to a fourth embodiment of the present invention.

Referring to FIG. 10, the automatic filter cleaning apparatus 1000 of the present embodiment is similar to that of the above-described second embodiment in that the second discharge pipe 1260 is connected to the first discharge pipe 1160, the first discharge pipe 1160 is connected to the processing tank 1400, and the third filter 1310 is provided downstream of the third control valve 1150. The automatic filter cleaning apparatus of the present embodiment may be disposed between the cooler 100 and the fluid pump 200.

The first discharge pipe 1160 is not connected to the outside atmosphere, but is connected to the processing tank 1400, and therefore, it is not necessary to provide a silencer. In addition, in the present embodiment, since the automatic filter cleaning apparatus is disposed between the cooler 100 and the fluid pump 200, the working fluid is in a low-temperature and low-pressure state. Thus, it is not necessary to provide an auxiliary cooler.

The automatic filter cleaning apparatus of the present embodiment includes a connection pipe 1410, which interconnects the processing tank 1400 and the transport pipe in which the working fluid of the system flows, and the connection pipe 1410 is provided with a transfer pump 1420 for supplying the working fluid stored in the processing tank 1400 back to the transport pipe, and more specifically, back to a point upstream of either of the filter lines 1100 and 1200. In order to reduce the load of the first filter 1110 and the second filter 1210, the connection pipe 1410 may be connected to the transport pipe between the cooler 100 and the filter lines 1100 and 1200.

The automatic filter cleaning apparatus 1000c of the present embodiment described above may enable the recycling of the working fluid by re-supplying the system with the working fluid from which the foreign substances have been removed and which are stored in the processing tank 1400, and thus may result in a reduction in system operation costs.

Next, an automatic filter cleaning apparatus 1000 according to a fifth embodiment of the present invention will be described with reference to FIG. 11.

Figure 11:
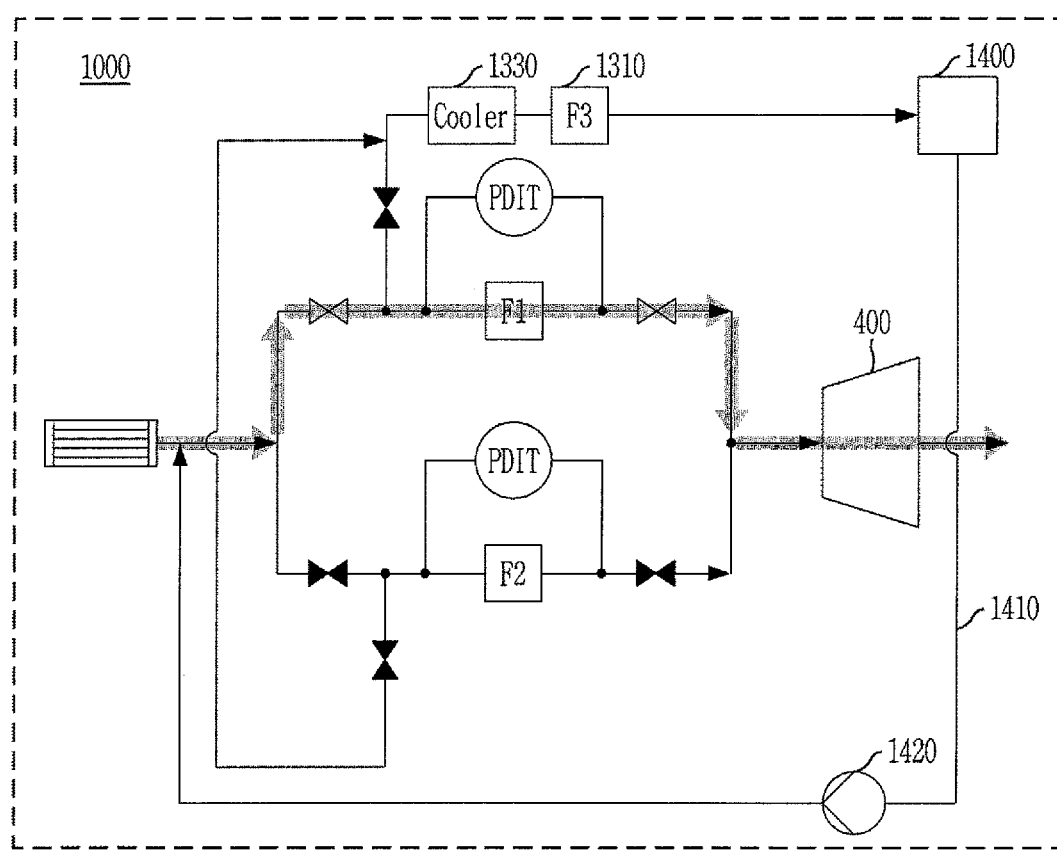
FIG. 11 is a view illustrating an automatic filter cleaning apparatus according to a fifth embodiment of the present invention.

Referring to FIG. 11, the automatic filter cleaning apparatus 1000 of the present embodiment is similar to that of the above-described second embodiment in that the second discharge pipe 1260 is connected to the first discharge pipe 1160, the first discharge pipe 1160 is connected to the processing tank 1400, and the third filter 1310 is provided downstream of the third control valve 1150. The automatic filter cleaning apparatus 1000 of the present embodiment may be provided on the input side of the turbine 400.

The first discharge pipe 1160 is not connected to the outside atmosphere, but is connected to the processing tank 1400, and therefore, it is not necessary to provide a silencer, which is the same as with the fourth embodiment. In the present embodiment, however, since the automatic filter cleaning apparatus is provided on the input side of the turbine 400, the working fluid is in a high-temperature and high-pressure state. Thus, the auxiliary cooler 1330 may be provided upstream of the third filter 1310.

The automatic filter cleaning apparatus 1000 of the present embodiment includes the connection pipe 1410, which interconnects the processing tank 1400 and the transport pipe in which the working fluid of the system flows, and the connection pipe 1410 is provided with the transfer pump 1420 for supplying the working fluid stored in the processing tank 1400 back to the transport pipe, and more specifically, back to a point upstream of either of the filter lines 1100 and 1200. In order to reduce the load of the first filter 1110 and the second filter 1210, the connection pipe 1410 may be connected to the transport pipe between the cooler 100 and the filter lines 1100 and 1200.

The automatic filter cleaning apparatus 1000 of the present embodiment described above may enable the recycling of the working fluid by re-supplying the system with the working fluid from which the foreign substances have been removed and which has been stored in the processing tank 1400, and thus may result in a reduction in system operation costs.

As is apparent from the above description, according to the embodiments of the present invention, it is possible to automatically clean a filter via back-flushing by using a pressure differential caused by foreign substance accumulation in the filter. Thereby, it is possible to semi-permanently use the filter without periodically replacing the filter, or with less frequent filter replacement, which enables a reduction in labor and costs associated with the maintenance and repair required for the replacement of the filter.

It should be appreciated that a modification of the above described embodiment in which dual filter lines are provided by connecting the first and second filter lines 1100 and 1200 to each other in parallel is possible, such that the concept of the present invention can be applied to a system using more than two such filter lines. That is, plural filter lines may be employed, in an analogous manner, by measuring the pressure differential caused by foreign substance accumulation in a filter provided in any one of multiple filter lines. When the preset reference value is reached for a given filter, the controller closes the necessary control valves to enable the back-flushing of the corresponding filter line, while allowing the remainder of the working fluid to pass through the other filter lines to the fluid pump 200. In this manner, there is less disruption in the flow of high-pressure working fluid through the system during a back-flushing operation (or during filter maintenance and repair). When normal operation of the supercritical fluid power generation system is stopped, the adoption of plural filter lines for the back-flushing operation of FIG. 6 is possible. In this case, the pressure differential for a given filter line is likewise measured against the preset reference value so that foreign substances accumulated in a corresponding filter can be removed via back-flushing by repeatedly opening and closing the control valve on the output side of the corresponding filter.

Although the present invention has been described with reference to a number of illustrative embodiments thereof, those skilled in the art will appreciate that the present invention can be variously modified and altered through the addition, change, or deletion of components without departing from the idea of the invention as disclosed in the accompanying claims and that such modifications and alterations fall within the scope of rights of the present invention.

What is claimed is:

1. A supercritical fluid power generation system comprising:
    a cooler configured to cause a phase change of a working fluid from a gaseous state to a liquid state or to cool the working fluid;
    a fluid pump configured to receive the working fluid from the cooler via a first transport pipe and to compress the working fluid received via the first transport pipe;
    a heat exchanger configured to heat the working fluid via a heat exchange with the working fluid which has passed through the fluid pump;
    at least one turbine connected to a generator to produce electric power and configured to receive the heated working fluid via a second transport pipe and to expand the working fluid received via the second transport pipe; and
    a plurality of filter lines connected to each other in parallel and configured to remove a foreign substance from working fluid flowing in at least one of the first and second transport pipes, each of the parallel connected filter lines including a common input communicating with an input of the at least one of the first and second transport pipes and a common output communicating with an output of the at least one of the first and second transport pipes; and
    a controller;
    the plurality of filter lines comprising:
        a first filter line comprising
            a first filter connected in series between the common input and the common output and configured to filter working fluid flowing through the first filter line and to perform backflushing through the first filter under control of the controller,
            a first control valve configured to control a flow of working fluid between the common input and the first filter,
            a second control valve configured to control a flow of working fluid between the first filter and the common output, and
            a first pressure differential indicating transmitter configured to measure a first pressure value across the first filter and to transmit the first pressure value to the controller, and
        a second filter line comprising
            a second filter connected in series between the common input and the common output and configured to filter working fluid flowing through the second filter line and to perform backflushing through the second filter under control of the controller,
            a fourth control valve configured to control a flow of working fluid between the common input and the second filter,
            a fifth control valve configured to control a flow of working fluid between the second filter and the common output, and
            a second pressure differential indicating transmitter configured to measure a second pressure value across the second filter and to transmit the second pressure value to the controller,
        wherein the controller is configured to independently control the first and second control valves based on the measured first pressure value and to independently control the fourth and fifth control valves based on the measured first pressure value, such that, during the backflushing through the first filter, the second control valve is controlled to enable the flow of the working fluid from the common output to the first filter while the first control valve is controlled to be closed and such that, during the backflushing through the second filter, the fifth control valve is controlled to enable the flow of the working fluid from the common output to the second filter while the fourth control valve is controlled to be closed.

2. The system according to claim 1, wherein the controller is further configured to control the first and second control valves such that the backflushing through the first filter is performed when the measured first pressure value reaches a first reference value and to control the fourth and fifth control valves such that the backflushing through the second filter is performed when the measured second pressure value reaches a second reference value.

3. The system according to claim 1,
    wherein the first filter line further comprises a first discharge pipe having a first end connected between the first control valve and the first filter and comprising a third control valve, and the second filter line further comprises a second discharge pipe having a second end connected between the fourth control valve and the second filter and comprising a sixth control valve; and wherein each of the first and second discharge pipes has a discharge end configured to discharge the removed foreign substance from the supercritical fluid power generation system.

4. The system according to claim 3, further comprising a third filter provided downstream of the third and sixth control valves.

5. The system according to claim 4, further comprising a silencer provided downstream of the third filter.

6. The system according to claim 4, further comprising an auxiliary cooler provided downstream of the third and sixth control valves and upstream of the third filter.

7. An automatic filter cleaning apparatus for removing a foreign substance from working fluid flowing in a transport pipe, the apparatus comprising:
- a controller;
- a first filter line having an input communicating with a common input of the transport pipe and an output communicating with a common output of the transport pipe, the first filter line comprising:
  - a first filter connected in series between the common input and the common output and configured to filter working fluid flowing through the first filter line and to perform backflushing through the first filter under control of the controller,
  - a first control valve configured to control a flow of working fluid between the common input and the first filter,
  - a second control valve configured to control a flow of working fluid between the first filter and the common output, and
  - a first pressure differential indicating transmitter configured to measure a first pressure value across the first filter and to transmit the first pressure value to the controller; and
- a second filter line that is connected in parallel with the first filter line and has an input communicating with the common input of the transport pipe and an output communicating with the common output of the transport pipe, the second filter line comprising:
  - a second filter connected in series between the common input and the common output and configured to filter working fluid flowing through the second filter line and to perform backflushing through the second filter under control of the controller,
  - a fourth control valve configured to control a flow of working fluid between the common input and the second filter,
  - a fifth control valve configured to control a flow of working fluid between the second filter and the common output, and
  - a second pressure differential indicating transmitter configured to measure a second pressure value across the second filter and to transmit the second pressure value to the controller,
wherein the controller is configured to independently control the first and second control valves based on the measured first pressure value and to independently control the fourth and fifth control valves based on the measured first pressure value, such that, during the backflushing through the first filter, the second control valve is controlled to enable the flow of the working fluid from the common output to the first filter while the first control valve is controlled to be closed and such that, during the backflushing through the second filter, the fifth control valve is controlled to enable the flow of the working fluid from the common output to the second filter while the fourth control valve is controlled to be closed.

8. The apparatus according to claim 7, wherein the controller is further configured to control the first and second control valves such that the backflushing through the first filter is performed when the measured first pressure value reaches a first reference value and to control the fourth and fifth control valves such that the backflushing through the second filter is performed when the measured second pressure value reaches a second reference value.

9. The apparatus according to claim 7, wherein the first filter line further comprises a first discharge pipe having a first end connected between the first control valve and the first filter and comprising a third control valve, and the second filter line further comprises a second discharge pipe having a second end connected between the fourth control valve and the second filter and comprising a sixth control valve, and
wherein each of the first and second discharge pipes has a discharge end configured to discharge the removed foreign substance from the automatic filter cleaning apparatus.

10. The apparatus according to claim 9, further comprising a third filter provided downstream of the third and sixth control valves.

11. The apparatus according to claim 10, further comprising a silencer provided downstream of the third filter.

12. The apparatus according to claim 10, further comprising an auxiliary cooler provided downstream of the third and sixth control valves and upstream of the third filter.

13. An automatic filter cleaning method comprising:
- forming a first filter line having an input communicating with a common input of a transport pipe and an output communicating with a common output of the transport pipe, the first filter line comprising a first filter connected in series between the common input and the common output and configured to filter working fluid flowing through the first filter line, a first control valve configured to control a flow of working fluid between the common input and the first filter, and a second control valve configured to control a flow of working fluid between the first filter and the common output;
- forming a second filter line that is connected in parallel with the first filter line and has an input communicating with the common input of the transport pipe and an output communicating with the common output of the transport pipe, the second filter line comprising a second filter connected in series between the common input and the common output and configured to filter working fluid flowing through the second filter line, a fourth control valve configured to control a flow of working fluid between the common input and the second filter, and a fifth control valve configured to control a flow of working fluid between the second filter and the common output;
- measuring a first pressure value across the first filter; and
- removing a foreign substance accumulated in the first filter by performing backflushing through the first filter when the measured first pressure value reaches a reference value, by opening the second, fourth, and fifth control valves while closing the first control valve.

14. The method according to claim 13, further comprising:
- filtering out the removed foreign substance using a third filter;

storing the working fluid, which has passed through the third filter, in a processing tank; and supplying the working fluid stored in the processing tank back to the transport pipe.

15. The method according to claim 14, further comprising removing noise generated by a discharge of the working fluid by introducing the working fluid filtered through the third filter to a silencer.

16. The method according to claim 14, further comprising cooling the working fluid including the removed foreign substance, by introducing the working fluid to an auxiliary cooler provided upstream of the third filter.

17. An automatic filter cleaning method comprising:
forming a first filter line having an input communicating with a common input of a transport pipe and an output communicating with a common output of the transport pipe, the first filter line comprising a first filter connected in series between the common input and the common output and configured to filter working fluid flowing through the first filter line, a first control valve configured to control a flow of working fluid between the common input and the first filter, and a second control valve configured to control a flow of working fluid between the first filter and the common output;

forming a second filter line that is connected in parallel with the first filter line and has an input communicating with the common input of the transport pipe and an output communicating with the common output of the transport pipe, the second filter line comprising a second filter connected in series between the common input and the common output and configured to filter working fluid flowing through the second filter line, a fourth control valve configured to control a flow of working fluid between the common input and the second filter, and a fifth control valve configured to control a flow of working fluid between the second filter and the common output;

measuring a first pressure value across the first filter; and removing a foreign substance accumulated in the first filter by performing backflushing through the first filter when the measured first pressure value reaches a reference value, by closing the first control valve while repeatedly opening and closing the second control valve to generate a pulsed flow of the working fluid through the first filter.

\* \* \* \* \*